United States Patent [19]
Huang

[11] Patent Number: 5,427,402
[45] Date of Patent: Jun. 27, 1995

[54] FOLDABLE STROLLER

[76] Inventor: Li-Chu C. Huang, No. 9, Alley 2, Lane 606, Sec. 2, Po Ai Rd., Chia Yi City, Taiwan

[21] Appl. No.: 311,952

[22] Filed: Sep. 26, 1994

[51] Int. Cl.$^6$ ............................................. B62B 7/06
[52] U.S. Cl. ................................. 280/642; 280/650; 403/102; 403/327
[58] Field of Search ............... 280/642, 647, 648, 643, 280/650, 47.4; 297/16.1, 31, 374; 403/91, 101, 102, 106, 326, 327

[56] References Cited

U.S. PATENT DOCUMENTS

| | | | |
|---|---|---|---|
| 4,415,180 | 11/1983 | Payne, Jr. | 280/642 |
| 4,986,564 | 1/1991 | Liu | 297/374 |
| 5,110,150 | 5/1992 | Chen | 280/642 |
| 5,244,228 | 9/1993 | Chiu | 280/47.4 |

FOREIGN PATENT DOCUMENTS 2179897  3/1987  United Kingdom ................. 280/642

Primary Examiner—Margaret A. Focarino
Assistant Examiner—Carla Mattix
Attorney, Agent, or Firm—Ross, Clapp, Korn & Montgomery

[57] ABSTRACT

A folding device stroller includes a positioning seat securely mounted to an upper end of each of two front members and a retainer seat securely mounted to an associated end of a handle of the stroller, the associated end of the handle being pivotally mounted to the positioning seat. The positioning seat includes a transverse positioning ring formed on an upper end thereof and a spring-biased button partially received in the positioning ring. The retainer seat includes a cutout defined therein thereby forming a handgrip and a transverse bore defined in a lower end thereof through which the button is passable. The button is biased to a position partially received in the bore to retain the stroller in an extended position, and the stroller is foldable when the button is pressed inwardly to disengage from the bore.

2 Claims, 6 Drawing Sheets

FOLDABLE STROLLER

BACKGROUND OF THE INVENTION

1. Field of the Invention

The present invention relates to a foldable stroller and, more particularly, to a stroller which can be easily folded, and the fabric on the folded stroller are avoided from contacting with the ground.

2. Description of Related Art

A variety of devices have heretofore been provided to strollers to improve the utility thereof, such as devices for controlling rotational direction of wheels, detachable and adjustable armrests, devices for changing orientation of handles, devices for adjusting inclination angle of the backrest, and devices allowing folding of the stroller.

A typical foldable stroller is shown in FIGS. 7 and 8 of the drawings and includes a pair of front members 80 and a handle member 90 having two ends thereof respectively connected to the upper ends of the front members 80. Each front member 80 has a positioning seat 81 at the upper end thereof and a connecting member 82 extending from a side of the positioning seat 81. The ends of the handle member 90 are respectively pivoted to the connecting members 82. An engaging seat 91 is mounted on each end of the handle member 90 and has a protrusion 92 and a spring-biased operative block 93 thereon. When folding the stroller, the operator firstly pulls the engaging seat 91 upwardly (see FIG. 8) by means of pressing the operative block 93 to urge the blocks 92 to disengage from the positioning seats 81. Thereafter, the handle member 90 may pivot to a folded status shown by the phantom lines in FIG. 9 for subsequent folding of the stroller which is conventional and therefore will not be further described.

However, the operator has to apply relatively large forces to pull the engaging seats 91 on both sides of the stroller as the stroller of such a structure cannot provide the palms or fingers of the operator with suitable support. Furthermore, the folded stroller must rest against a wall when in an upright position, yet in which status the fabric thereon shall be in contact with the ground and thus get dirty.

Therefore, there has been a long and unfulfilled need for a stroller with an improved arrangement to mitigate and/or obviate the above-mentioned drawbacks.

SUMMARY OF THE INVENTION

A folding device for a stroller provided by the present invention includes a positioning seat securely mounted to an upper end of each of two front members and a retainer seat securely mounted to an associated end of a handle of the stroller, the associated end of the handle being pivotally mounted to the positioning seat. The positioning seat includes a transverse positioning ring formed on an upper end thereof and a spring-biased button partially received in the positioning ring. The retainer seat includes a cutout defined therein thereby forming a handgrip and a transverse bore defined in a lower end thereof through which the button is passable. The button is biased to a position partially received in the bore to retain the stroller in an extended position, and the stroller is foldable when the button is pressed inwardly to disengage from the bore.

In accordance with one aspect of the invention, each positioning seat includes a slot defined in a periphery thereof, and the associated button includes two slits in a periphery thereof thereby forming a flexible engaging member therebetween. The associated retainer seat has a stop in the lower end thereof such that the flexible engaging member is passable through the slot for releasably engaging with the stop.

Other objects, advantages, and novel features of the invention will become more apparent from the following detailed description when taken in conjunction with the accompanying drawings.

DESCRIPTION OF THE PREFERRED EMBODIMENTS

Figure 1:
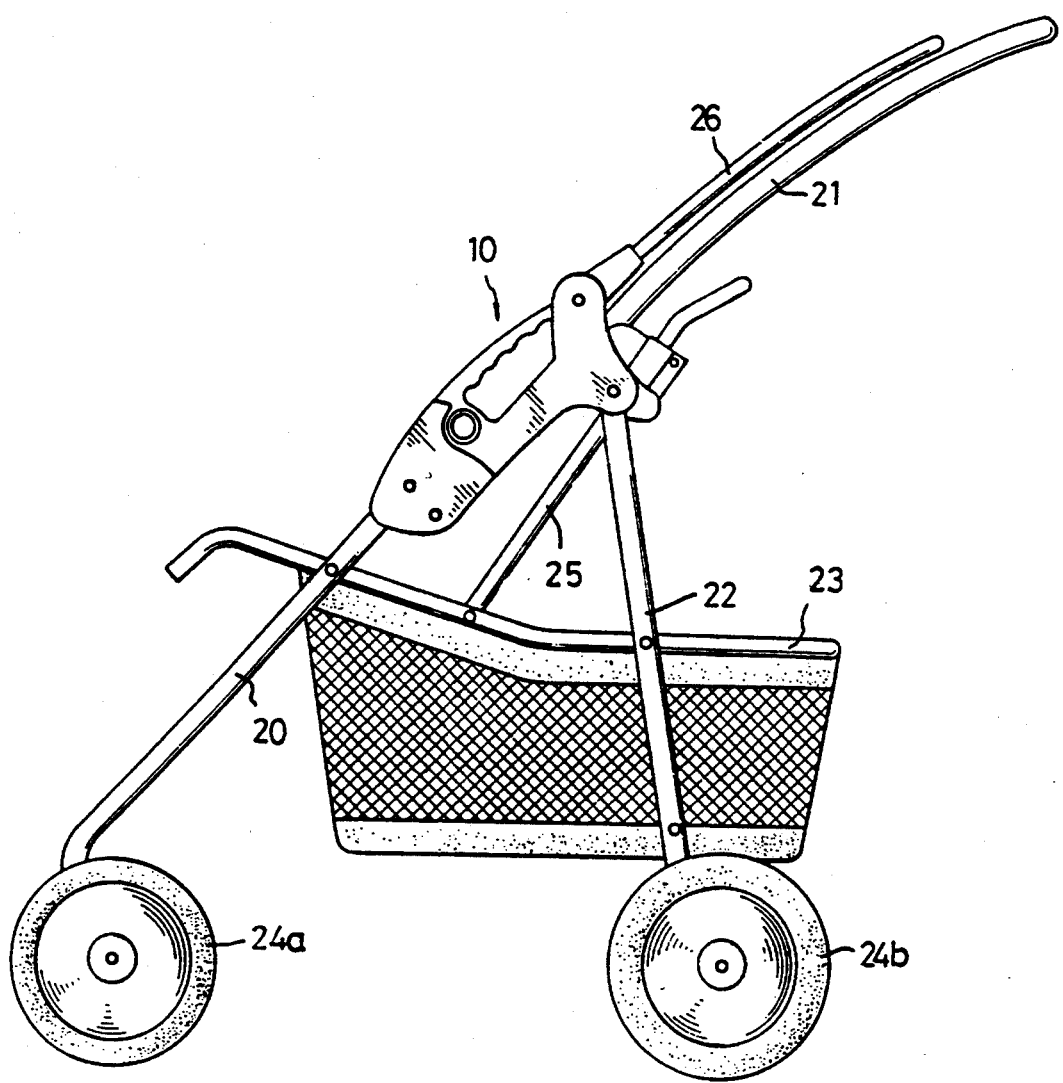
FIG. 1 is a schematic side elevational view of a foldable stroller with a folding device in accordance with the present invention.

Referring to FIGS. 1 through 5 and initially to FIG. 1, a stroller generally includes a pair of front members 20 each having a lower end to which a front wheel 24a is mounted, a pair of rear members 22 each having a lower end to which a rear wheel 24b is mounted, a substantially U-shaped seat frame member 23 pivoted to the front and rear members 20 and 22, and a substantially U-shaped handle 21 having two ends each of which is mounted to an associated front member 20 by a folding device 10. A substantially U-shaped backrest frame member 25 has two distal lower ends thereof respectively mounted to two limbs of the U-shaped seat frame member 23. A canopy supporting member 26 is removably mounted to the folding device 10. Upper ends of the rear members 22 are also pivotally mounted to the folding device 10.

Figure 2:
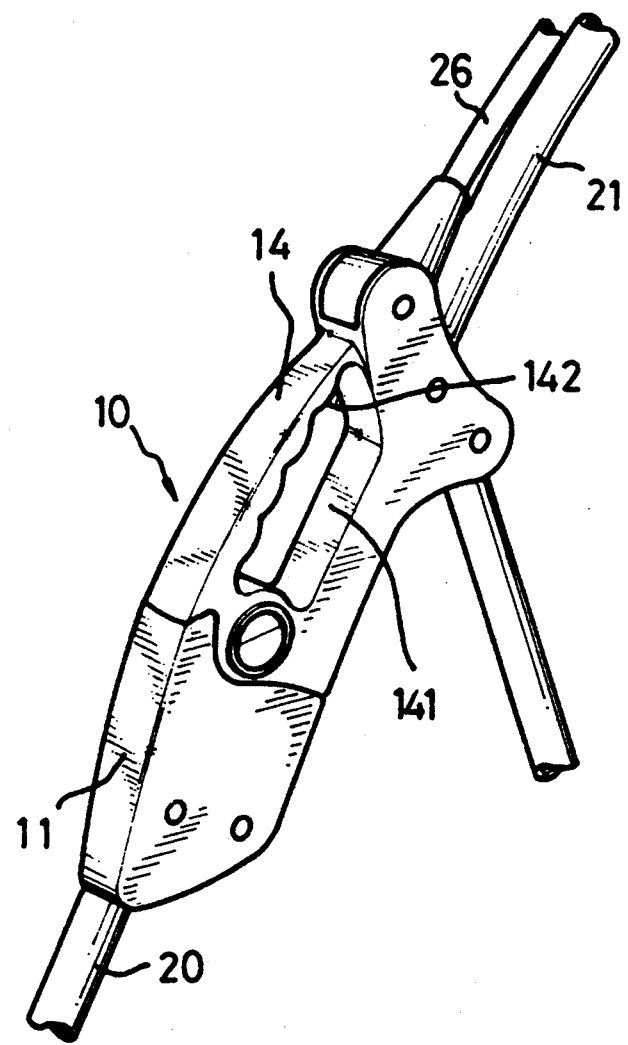
FIG. 2 is a partial perspective view illustrating the folding device mounted between an upper end of a front member and an end of a handle.
Figure 3:
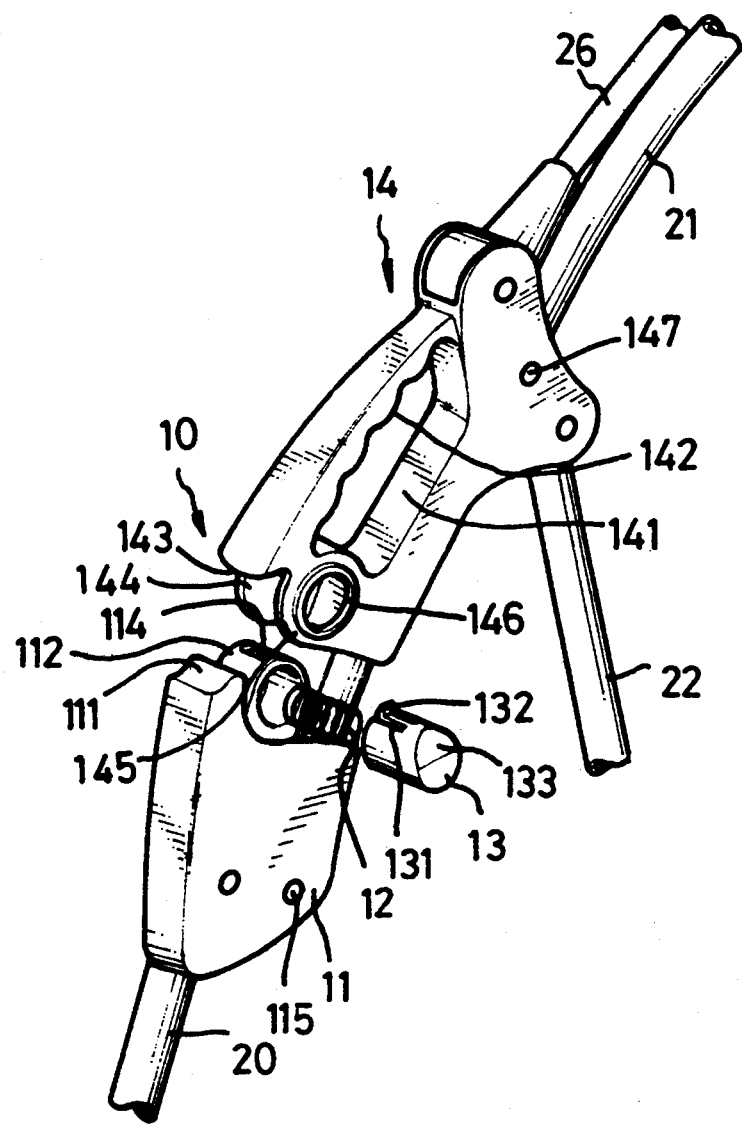
FIG. 3 is a partially exploded perspective view of the folding device in FIG. 2.

Referring to FIGS. 2 and 3, each folding device 10 includes a positioning seat 11 securely mounted to an upper end of the associated front member 20. The positioning seat 11 includes a transverse positioning ring 112 having a closed end and an open end and a slot 114 in a periphery thereof. A spring 12 is received in the positioning ring 112. Partially received in the positioning ring 112 is a button 13 having a beveled surface 133 on one end thereof which is normally outside the positioning ring 112 and a flexible engaging member 132 which is formed by cutting two parallel slits 131 in a periphery thereof. The positioning seat 11 further includes a curved surface 111 on the upper end thereof, the purpose of which will be explained later.

Figure 4:
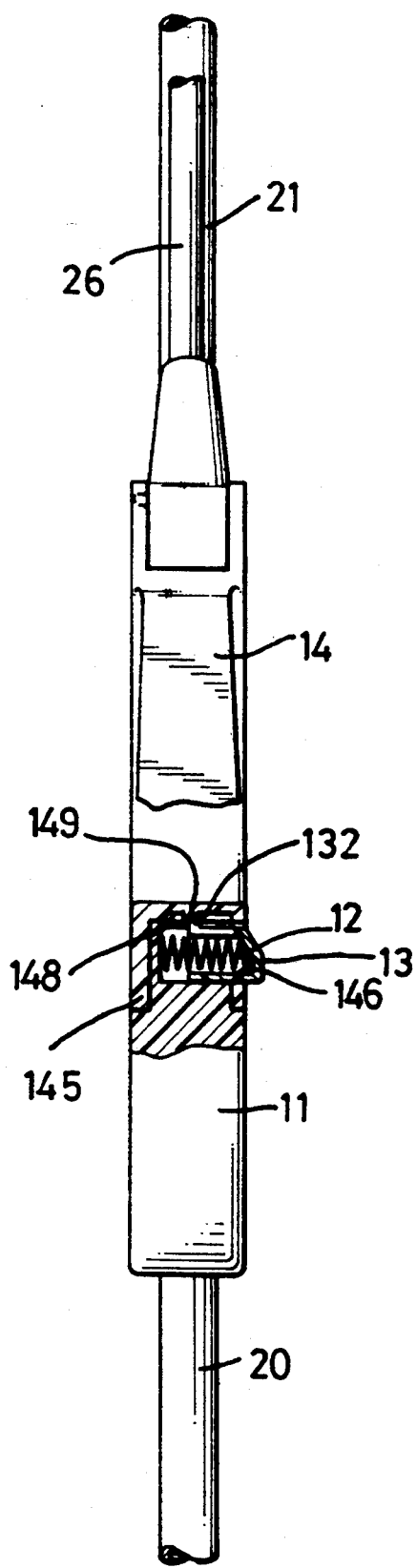
FIG. 4 is a rear view, partly in section, of the folding device.
Figure 5:
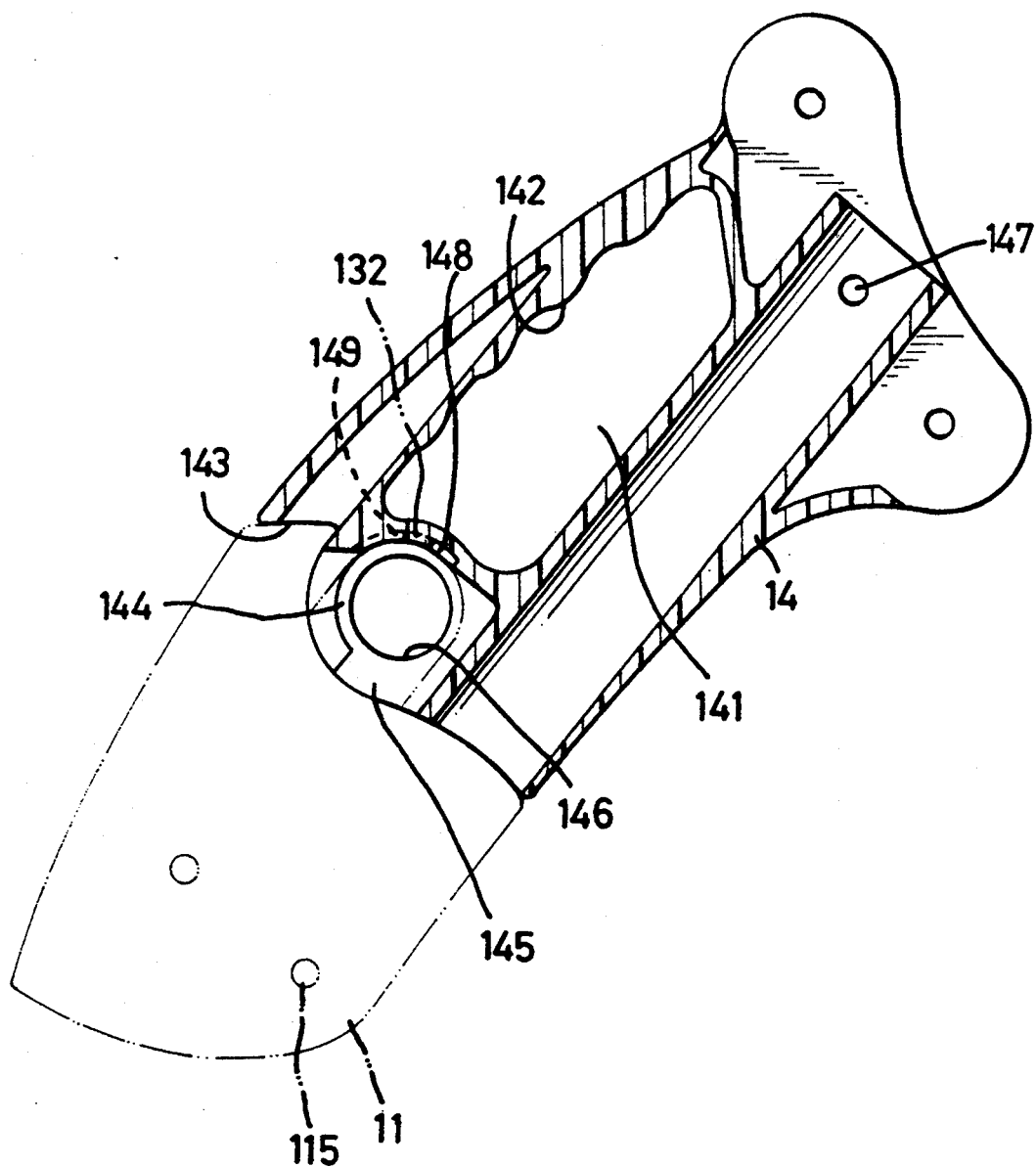
FIG. 5 is a schematic side view, partly in section, of the folding device.
Figure 7:
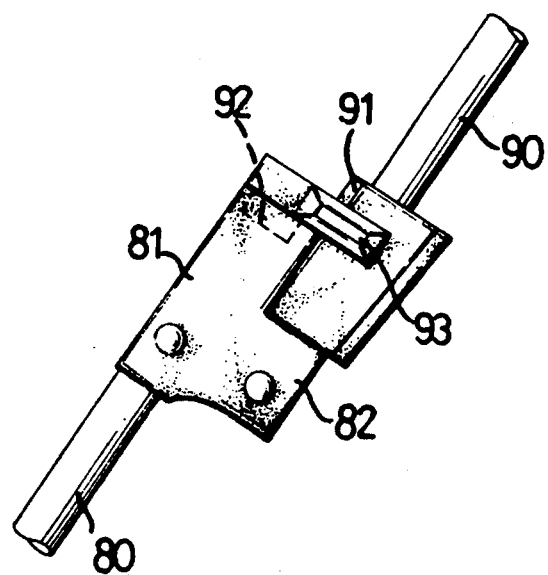
FIGS. 7 and 8 are schematic side views illustrating a folding device according to prior art.
Figure 8:
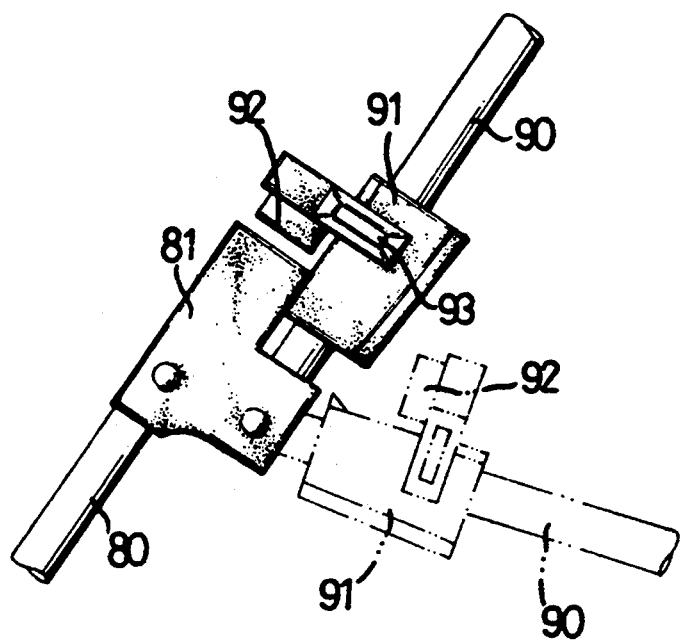

Each folding device 10 further includes a retainer seat 14 securely mounted to the associated end of the handle 21 by a pin 147 to move therewith and to which the upper end of the associated rear member 22 is pivotally mounted. The retainer seat 14 has a cutout 141 defined therein thereby forming a handgrip 142. The distal end of the handle 21 is pivotally mounted to the positioning seat 11 by another pin 115. The retainer seat 14 includes a pair of spaced walls 145 at a lower end thereof which define a receiving compartment 144 therebetween, a bore 146 being defined in one of the walls 145. Referring to FIGS. 4 and 5, the receiving compartment 144 defines a space 148 for folding operation and includes a stop 149 therein, the purpose of which will be explained hereinafter. The retainer seat 14 further includes a curved surface 143 on the lower end thereof for fittingly engaging with the curved surface 111 on the upper end of the positioning seat 11.

Figure 6:
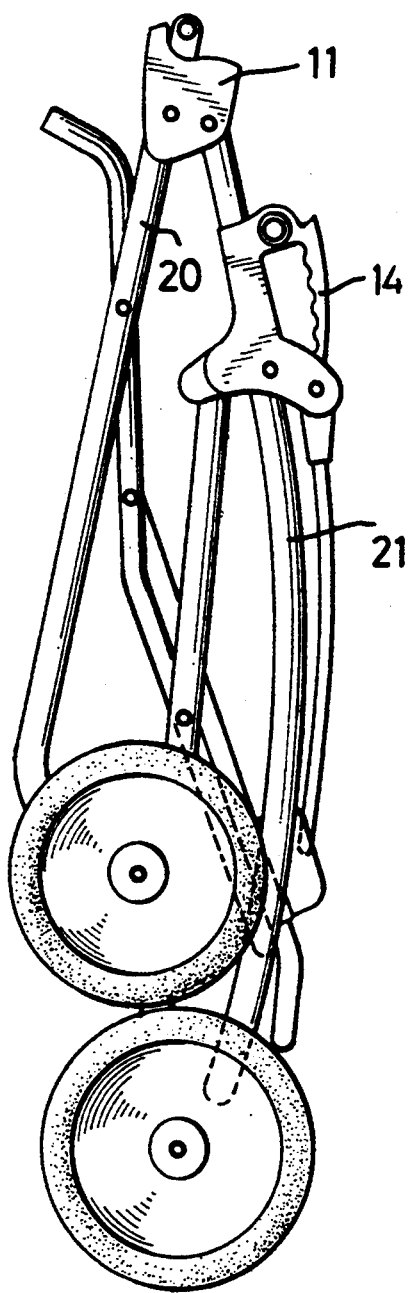
FIG. 6 is a side elevational view illustrating the stroller is in a folded status.

When the stroller is in an extended position, the folding device is in a status shown in FIGS. 1, 2, 4 and 5. Referring to FIG. 4, for folding the stroller, each button 13 is pressed inwardly such that the flexible engaging member 132 engages with the stop 149 and the whole button 13 is received in the positioning ring 112. Then, the operator may apply a downward force by his/her palms to the retainer seats 14 to cause the retainer seats 14 to pivot about pins 115 until the flexible engaging members 132 disengages with the associated stops 149 (i.e., the flexible engaging members 132 and the stops 149 move away from each other) and the buttons 13 return to their original positions (see FIG. 4) under the action of the spring 12. The completely folded stroller is shown in FIG. 6, and the fabric (not shown in FIG. 6) on the stroller is between the front and rear members 20 and 22, such that the fabric shall not be in contact with the ground and thus may keep clean during storage or carrying.

For extending the stroller, the retainer seats 14 are pivoted upwardly about pins 115 such that the wall 145 (which has a bore 146 therein, see FIG. 3) impinges the beveled surface 133 of the associated button 13 thereby causing inward movement of the associated button 13. Thereafter, under the action of the spring 12, each button 13 moves outwardly beyond the bore 146 (see FIG. 4) to secure the positioning seat 11 and the associated retainer seat 14 together. It is appreciated that the slot 114 allows the flexible engaging member 132 to pass therethrough for releasably engaging with stop 149 and retrains excessive displacement of the flexible engaging member 132.

According to the above description, it is appreciated that the drawbacks encountered by the prior art foldable strollers are mitigated and/or obviated under the provision of the invention.

Although the invention has been explained in relation to its preferred embodiment, it is to be understood that many other possible modifications and variations can be made without departing from the spirit and scope of the invention as hereinafter claimed.

I claim:

1. A folding device for connecting an upper end of each of a pair of front members and an associated end of a handle of a stroller, comprising:

a positioning seat securely mounted to the upper end of each of said pair of front members and comprising a transverse positioning ring formed on an upper end thereof, a spring-biased button being partially received in said positioning ring; and a retainer seat securely mounted to the associated end of the handle and having a cutout defined therein thereby forming a handgrip and a transverse bore defined in a lower end thereof through which said button is passable, the associated end of the handle being pivotally mounted to said positioning seat;

whereby said button is biased to a position partially received in said bore to retain the stroller in an extended position, and the stroller is foldable when said button is pressed inwardly to disengage from said bore.

2. The folding device as claimed in claim 1 wherein each said positioning seat includes a slot defined in a periphery thereof, and the associated button includes two slits in a periphery thereof thereby forming a flexible engaging member therebetween, the associated retainer seat having a stop in the lower end thereof, said flexible engaging member being passable through said slot for releasably engaging with said stop, and a spring being positioned between said positioning ring and said button to bias said button.

* * * * *